United States Patent [19]

Hoffmann

[11] Patent Number: 4,545,832

[45] Date of Patent: Oct. 8, 1985

[54] MACHINE AND METHOD FOR APPLYING HEAT SHRINK LABELS

[75] Inventor: Wolfgang Hoffmann, Modesto, Calif.

[73] Assignee: B & H Manufacturing Company, Inc., Ceres, Calif.

[21] Appl. No.: 519,267

[22] Filed: Aug. 1, 1983

Related U.S. Application Data

[63] Continuation-in-part of Ser. No. 382,374, May 27, 1982, , Ser. No. 438,386, Nov. 1, 1982, Pat. No. 4,406,721, and Ser. No. 471,655, Mar. 3, 1983, Pat. No. 4,416,714.

[51] Int. Cl.⁴ .............................................. B29C 27/00
[52] U.S. Cl. ...................................... 156/86; 156/294; 156/446; 156/447; 156/448; 156/458; 264/342 R; 264/DIG. 71
[58] Field of Search ................... 156/84, 86, 212, 215, 156/446, 447, 448, 456, 457, 458, 294; 264/230, 248, 342 R, DIG. 71

[56] References Cited

U.S. PATENT DOCUMENTS

| | | | |
|---|---|---|---|
| 4,014,724 | 3/1977 | Rausing | 156/86 |
| 4,072,553 | 2/1978 | Braker et al. | 156/86 |
| 4,092,382 | 5/1978 | Heckman et al. | 264/230 |
| 4,108,710 | 8/1978 | Hoffmann | 156/458 |
| 4,349,399 | 9/1982 | Obrist et al. | 156/497 |

FOREIGN PATENT DOCUMENTS 1012906  6/1977  Canada .

*Primary Examiner*—Jay H. Woo
*Assistant Examiner*—Timothy W. Heitbrink
*Attorney, Agent, or Firm*—Edward B. Gregg

[57] ABSTRACT

Method and apparatus for heat shrinking projecting edges of heat shrinkable (but unshrunken) film onto articles such as cylindrical containers. The film is tightly wrapped around the bodies of the articles and the overlapping ends are held together by glue. The projecting edges of the articles are then heat shrunk onto the shoulders and/or curved lower ends of the bodies as the containers are transported and are caused to spin while being transported. In so doing the hot air is blown in a direction such that it does not blow directly onto the glue at the side seams. This may be accomplished by using a circular, turret type transport and by having blowers which blow hot air obliquely, rather than radially at the articles. Where the articles are closely packed, each article acts to shield the next article when its side seam is parallel to the flow of hot air.

3 Claims, 12 Drawing Figures

MACHINE AND METHOD FOR APPLYING HEAT SHRINK LABELS

This application is a continuation-in-part of my co-pending applications Ser. No. 382,374, filed May 27, 1982, entitled "SYSTEM FOR APPLYING HEAT SHRINK FILM TO CONTAINERS AND OTHER ARTICLES AND HEAT SHRINKING THE SAME" now abandoned; Ser. No. 438,836, filed Nov. 1, 1982, entitled "SYSTEM AND APPARATUS FOR APPLYING HEAT SHRINK FILM TO CONTAINERS AND OTHER ARTICLES AND HEAT SHRINKING THE SAME" now U.S. Pat. Ser. No. 4,406,721 and Ser. No. 471,655, filed Mar. 3, 1983, entitled "LABELING MACHINE FOR HEAT SHRINK LABELS" now U.S. Pat. No. 4,416,714.

In my applications above identified I have described methods and apparatus for applying heat shrinkable (but unshrunk) film material to articles such as cylindrical containers. In the method there described a segment of film material having a length slightly greater than the circumference of the article is applied by a conventional labeling procedure as follows: A roll of film material is provided; it is supplied continuously from the roll to a rotating vacuum drum; segments of film are severed between the roll and the vacuum drum and each segment is held on the vacuum drum by vacuum and is transported to a segment applying station; glue is applied to the leading end and to the trailing end of the segment while it is on the vacuum drum; articles such as containers are supplied continuously to the segment applying station in tangent relation to the leading end of the segments of film material and the leading end of each segment is adhered to the container by glue; and the container is rotated about its cylindrical axis to wrap the segment around it, causing the trailing end to overlap the leading end and to be adhered thereto by means of glue.

This is a standard labeling operation but differs in that the label material is heat shrinkable material and by reason of the fact that one edge or the other or both edges (hereinafter referred to as "ends") are caused to project beyond the upper end and/or the lower end of the cylindrical body of the container. This projecting end or these projecting ends are then subjected to heat in the form of a current of hot air to shrink the projecting ends onto the container. The main body of the label is not shrunk.

This invention will be described hereinafter for the most part with reference to the application of labels to cylindrical containers but it will be understood that heat shrinkable film material in general may be applied and that the articles to which they are applied may be other than containers. Also that they need not be cylindrical. This mode of operation results in what is called herein a "side seam", which is the strip where the trailing end of the label overlaps the leading end. The leading end is adhered to the container by glue and the trailing end is adhered to the leading end by glue.

This invention is directed to solving a problem in connection with the side seams.

It has been found that, when hot air is applied to the projecting end or ends of the label, the side seam sometimes causes difficulty due, apparently, to the fact that the hot air softens or melts the glue in the side seam. Whatever the cause, the fact is that the side seam tends to curl and an unsightly end product results.

It is an object of the present invention to provide a solution to this problem.

Certain embodiments of the invention are shown by way of example in the accompanying drawings, in which:

FIG. 6A shows a label applied to a container and with projecting ends, FIGS. 6B, 6C and 6D showing successive stages in heat shrinking the lower projecting end of the label;

Figure 1:
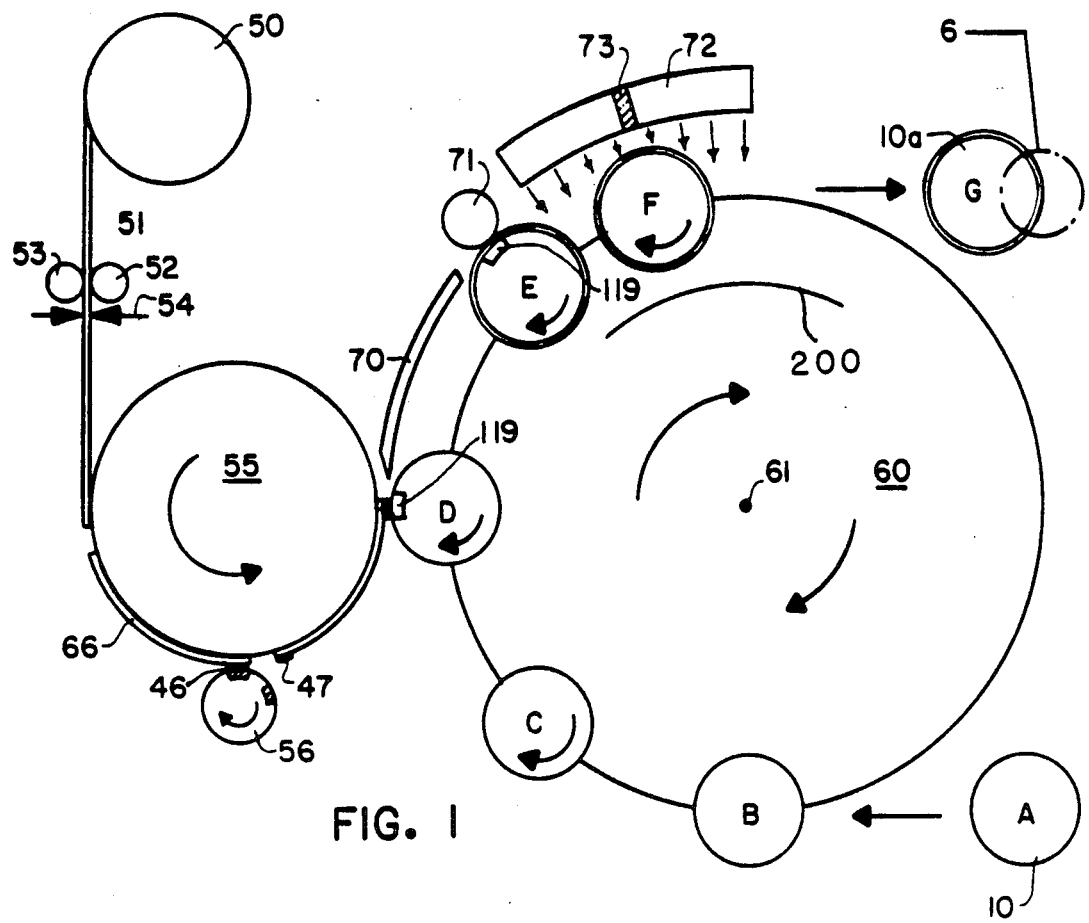
FIG. 1 is a diagrammatic view of the labeling and heat shrinking operation.

A container with a heat shrink label applied thereto, and the side seam which causes the difficulty mentioned above will first be described with reference to FIG. 6A and FIG. 2.

Referring to FIG. 6A, a container is shown which is generally designated by the reference numeral 10 and which may be of plastic (e.g. PET, which stands for polyethylene terephthalate), glass or any other suitable material and which has a cylindrical body 11, a neck 12, an inwardly sloping portion 13 connecting body portion 11 with the bottom of the container and a connecting portion 14 connecting the body portion 11 with the neck 12. The label is generally indicated by the reference numeral 16 and as will be seen it is wrapped around and tightly applied to the container, and it has a length from top to bottom greater than the length of the body portion 11 of the container such that there are two projecting end portions, namely the upper end portion 20 which is opposite and stands free of the shoulder portion 14 and a lower portion 21 which stands opposite but is free from the lower portion 13.

Figure 2:
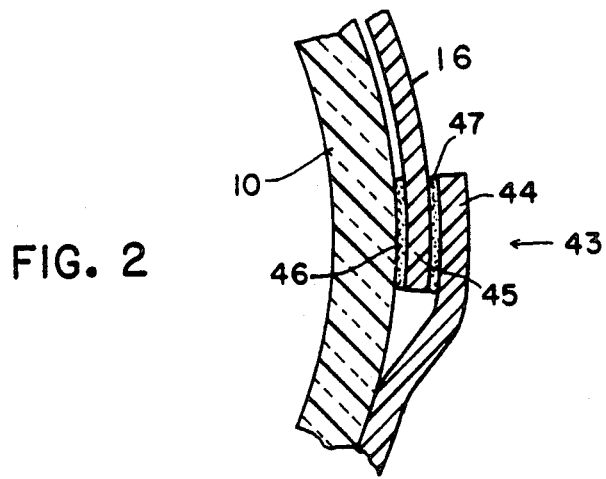
FIG. 2 is a fragmentary, horizontal cross section through a container and the applied film showing the side seam.

Referring now to FIG. 2 a fragment of a label 16 is shown applied to a container 10 and forming a side seam 43. This is formed by the trailing end 44 of the label and the leading end 45 of the label, there being a layer of hot melt glue 46 between the leading end and the container and another layer of hot melt glue 47 between the trailing end and the leading end. It is this seam which causes the difficulty to which this invention is particularly directed.

Referring now to FIG. 1, a complete assembly, such as a labeling assembly, is shown. It comprises a roll 50 of heat shrink film 51 (e.g. label stock), a drive roller 52 and a pinch roller 53, a cutter 54 and a vacuum drum 55. These elements are of known construction and mode of operation. Other elements not shown may be included, e.g. tensioning means for the label stock 51. A glue applicator 56 of known construction is also shown which applies hot melt glue to the leading end and the trailing end of each label.

The glue applicator 56 may be a rotating member which dips into a pot of hot melt glue (not shown) and it may be caused to oscillate as well as rotate in timed relation to the rotation of the vacuum drum 55 to apply a layer of glue 46 to the leading end of each label and a layer of glue 47 to the trailing end of each label. Alternatively the drum 55 may be formed with raised areas which are spaced so that the leading and trailing ends of the label are elevated from the main surface of the drum and are contacted by a glue applicator 56 which rotates but does not oscillate. Both types of glue applicator systems are well known.

Also shown is a turret 60 rotating about an axis 61 which receives containers 10 from a container feed (not shown). The turret 60 is provided with pairs of chucks such as those shown at 110 and 110a in FIG. 3. Each container, in turn, is clamped between a pair of chucks and is transported orbitally about the axis 61 of turret 60 and is caused to spin about its own cylindrical axis. A glue line may be applied to each container such as that shown at 53 in FIG. 1 of my U.S. Pat. No. 4,108,710. However, it is preferred to apply the glue to the leading and trailing ends of the label. It will be understood that the various driven elements are coordinated and synchronized to accomplish the desired results.

Figure 5:
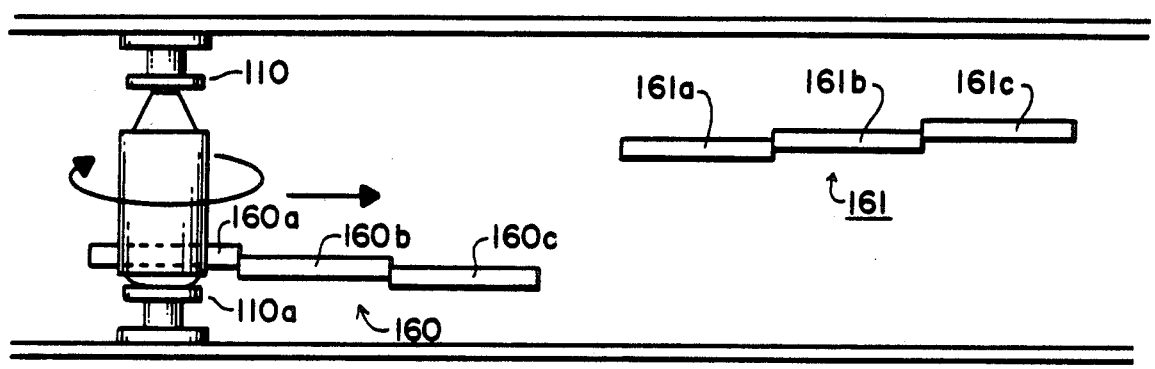
FIG. 5 is a view in front elevation of the blower system of FIG. 4.

Each severed label 66 is gripped by vacuum drum 55 and is rotated counterclockwise as viewed in FIG. 5 past the glue applicator 56 which applies glue to the leading and trailing ends of each label. Preferably as described in my U.S. Pat. No. 3,765,991 the leading end of the label stock 51 is gripped by the vacuum drum 55 before a label is severed. Also the drum 55 is rotated at a surface speed greater than the speed at which the label stock is fed by the rollers 52 and 53. The label then proceeds to a labeling station D. The leading end of each label is adhered to the container at which time vacuum is released and the label commences to wrap around the spinning container until the glued trailing end overlaps and is adhered to the leading end of the label. If a partial wrap is to be applied, the glued trailing end will be adhered directly to the container. This wrapping is aided by an arcuate guard and pressure member 70 which is concentric to the container turret 60 and is spaced from the turret axis 61 so that it will restrain the loose end of the label until it is wrapped around the container. The guard 70 may be a brush or made of rubber or other material which does not mar the label. It need not extend above or below the cylindrical body portion of the container. Preferably the guard 70 is formed with a groove or channel (not shown) facing the label and the container which has a width equal to the width of the label. This design ensures that, regardless of irregularities in the containers or other disturbing factors, the leading and trailing ends 45 and 44 are not misaligned.

A pressure roller 71 is provided to apply pressure to the side seam so that it is firm and even. This roller may be made of metal, plastic, rubber or other suitable material and it is rotated at a surface speed which is the same as or slightly slower than the surface speed of the container. The use of a slightly slower speed causes a pull or tension which is desirable.

This mode of operation results in the formulation of a side seam such as shown at 43 in FIG. 2. As described in the aforesaid copending applications, glue may be applied at 46 and 47 the entire length of the label including the projecting end portions 20 and 21 or it may be applied only to that portion of the label which is adhered to and is in contact with the body portion 11 of the container.

Also shown in FIG. 1 is a hot air blower 72 which directs hot air at the projecting end portion or end portions 20 and 21 of the label to cause it (or them) to shrink onto the container.

Figure 3:
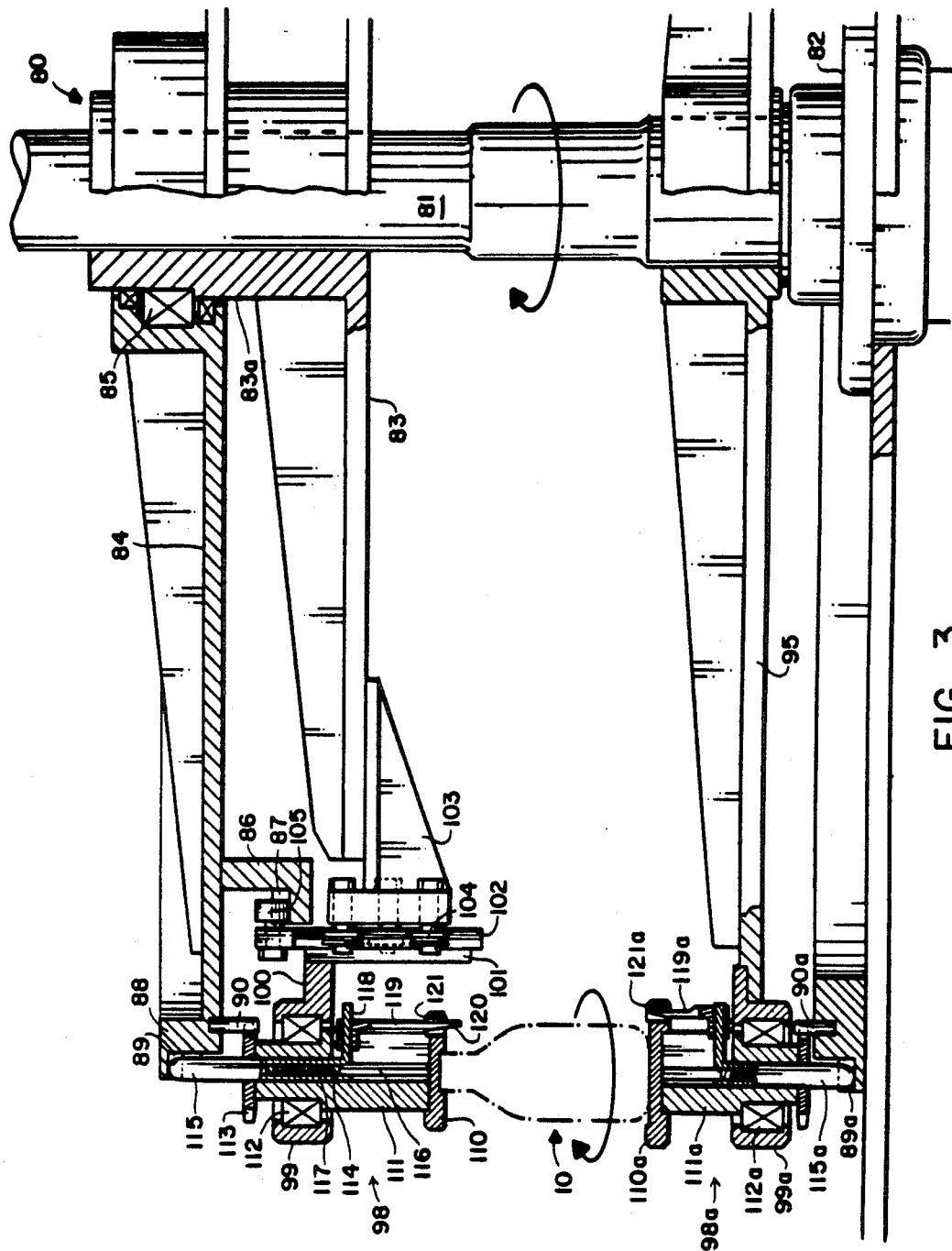
FIG. 3 is a vertical cross section through a container transport employed for transporting containers to the labeling station, rotating the containers to wrap labels around them and moving the rotating containers past hot air blowers to accomplish shrinking of the projecting end or ends of the label.

Referring now to FIG. 3, a preferred type of apparatus is shown for transporting containers from point A to point G in FIG. 1. The apparatus embodies extensible-retractable tongues 119 and 119A (see below). As described in copending application Ser. No. 438,386 the tongues, when extended, lie between the projecting ends 20 and 21 of the label and the container and serve as continuations of the body portion 11 of the container to facilitate the application of glue to the entire length of the side seam 43. Alternatively, as described in copending application Ser. No. 471,655 these tongues, when extended, lie outside the label and serve as heat shields and also to urge the projecting portions 20 and 21 against the container. In the present invention either of these embodiments may be employed or the tongues 119 and 119A may be omitted altogether.

By way of example, the embodiment shown in FIG. 3, which is the subject of copending application Ser. No. 438,386 is illustrated as an embodiment of the present invention.

Referring now to FIG. 3 a turret assembly is there shown and is generally designated by the reference numeral 80. A main shaft 81 is shown which is journalled in a frame 82 and mounted to rotate with it are a number of arms or spokes 83 which are integral with a hub 83a which is fixed to the shaft 81 to rotate with it. Rotatably mounted on the hub 83a is a plate 84 which is mounted on hub 83a by means of bearings 85. The plate 84 is fixed by suitable means (not shown) against rotation so that the shaft 81 and parts operated by it may rotate about the axis of the shaft 81 while the plate 84 and parts supported by it are stationary.

The plate 84 supports a bracket 86 which in turn supports an arcuate continuous cam 87. At its outer edge the plate 84 is formed with a bracket 88, which supports a continuous arcuate cam 89. The plate 84 also supports pins 90 which form a gear to drive sprockets as described hereinafter. Lower arms 95 are provided which are fixed to and rotate with the shaft 81 and support a cam 89a and pins 90a which are comparable to and serve a similar purpose as the cam 89 and pins 90.

A chuck assembly is provided which includes a collar 99 which is connected by a bracket 100 to a bar 101 which in turn supports a rail 102 of angular cross-section. A bracket 103 connected to the spoke 83 supports rollers 104 which have grooved peripheries which ride upon the rail 102. At its upper end the rail 102 supports a cam follower roller 105 which rides on the cam 87. A chuck 110 is provided which is shaped so that it will fit snugly over the crown of a container 10. This chuck is carried by a hub 111 which forms the inner race for roller bearings 112, the outer race of which is provided by the collar 99. Attached to the upper end of the hub 111 is a sprocket 113 which meshes with the pins 90 and serves to rotate the chuck 110. The hub 111 is hollow, being formed with an axial passage 114 in which a pin 115 having a rounded upper end is slidable. The rounded upper end of the pin 115 bears against the cam 89. A pin 116 extends upwardly from the chuck 110 and a spring 117 lodged within the tubular passage 114 and seated on the pin 116 serves to hold the rounded upper end of the pin 115 at all times against the cam 89.

A bracket 118 is provided which is fixed to the pin 115 and which supports a tongue 119 which extends downwardly and has a tapered tip 120. The tongue passes through an opening 121 in the chuck 110. The taper of the tip 120 conforms to the surface of the container at the junction of the shoulder with the cylindrical body of the container.

A chuck assembly 98a is provided at the bottom and is supported by the plate 95. Parts similar to parts in the chuck assembly 98 are similarly numbered with the addition of the letter "a". The construction and operation will be evident from the description above of the chuck assembly 98 except that there is no cam 87, cam follower 105 and associated parts, the reason being that the lower chuck assembly 98a is not elevated and lowered as in the upper chuck assembly 98.

It will be understood that each pair of arms or spokes 83 and 95 is provided with chuck assemblies 98 and 98a and that as many pairs of arms and chuck assemblies are provided as desired.

It will be apparent that as the shaft 81 rotates each of the chuck assemblies 98 and 98a will rotate orbitally with the shaft 81 about the axis thereof. It will also be apparent as more fully described hereinafter that the upper chuck assembly 98 and with it the chuck 110 are caused periodically to elevate by reason of the cam 87 and the cam follower roller 105 and the supporting mechanism described above and illustrated in FIG. 3 and that meanwhile the chuck 110 will be caused to rotate about its own axis by reason of the sprocket 113 and pins 90. It will also be apparent that the tongue 119 will undergo periodic elevation (retraction) and lowering (extension) by reason of engagement of the pin 115 with the cam 89. It will similarly be apparent that the lower chuck assembly 98a will rotate orbitally with the shaft 81; that the lower chuck 110a will rotate about its own axis; and that the tongue 119a will undergo periodic elevation (extension) and lowering (retraction).

Referring to FIG. 1 as well as to FIG. 3, the profile of the cam 87 is such that each upper chuck 110 is in elevated position at the station marked B in FIG. 1 where a contained enters the turret so as to clear the crown of the container. The container is seated on the lower chuck 110a. Then the cam 87 and the cam roller 105 will cause the bar 101 and bracket 100 to lower thereby contacting the respective chuck 110 with the crown of the container and clamping the container between the upper and lower chucks and causing the container to spin. This driving relationship between the chucks 110 and 110a and the container 10 will continue through the stations indicated as C, D, E and F in FIG. 1 and then the upper chuck 110 will be elevated to free the container which will be extracted by suitable extraction mechanism (not shown) such as, for example, a star wheel.

Adjustments for containers of different heights and different shapes can be readily made. For example hub 83a may be raised or lowered and chucks 110 and 110a may be changed.

The manner in which the tongue 119 and 119A operate and the functions they perform are described in my copending applications Ser. Nos. 438,386 and 471,655 which are incorporated herein by reference. Either such embodiment may be employed in the practice of the present invention or some other embodiments, e.g. the turret assembly 80 of FIG. 3 without the tongues 119 and 119A (and their operating mechanisms), may be employed.

Figure 4:
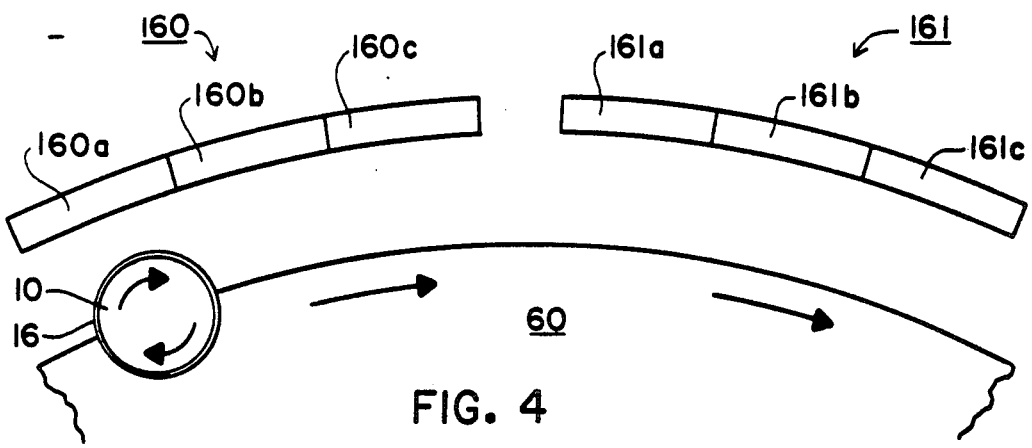
FIG. 4 is a diagrammatic view from above of a preferred arrangement of hot air blowers.
Figure 6:
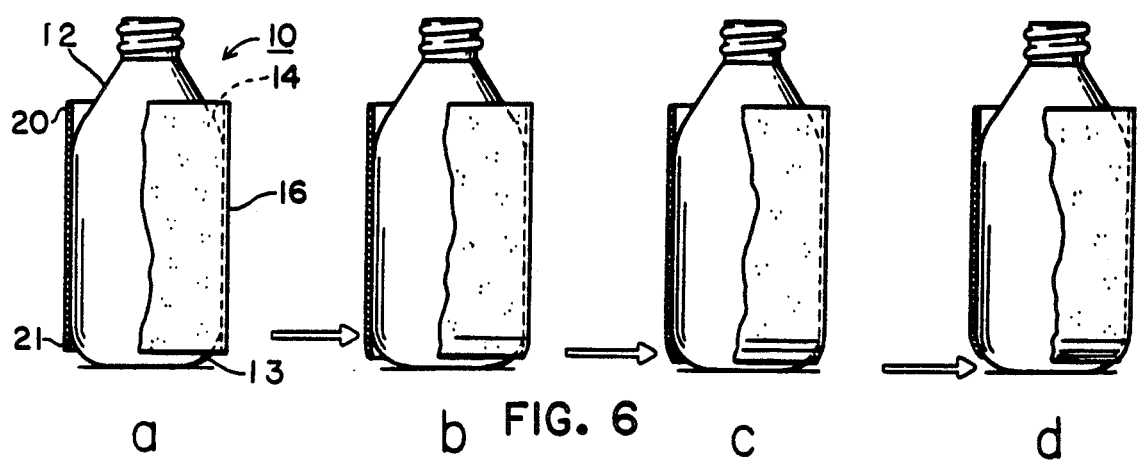
FIGS. 6A, 6B, 6C and 6D are views of a container in various stages of application of a label thereto.

A preferred method of applying hot air in successive stages is illustrated in FIGS. 4, 5 and 6, which will now be described.

Referring now to FIGS. 4, 5 and 6, a preferred embodiment of the invention at the heat shrinking station F is illustrated. A portion of turret 60 is shown and a container 10 with a label 16 applied thereto is also shown. Omitted from FIG. 4 but shown diagrammatically in FIG. 5 are the chucks 110 and 110a.

Heater assemblies 160 and 161 are provided for shrinking the lower overlap 21 and the upper overlap 20, respectively. The assembly 160 comprises three heaters 160a, 160b and 160c which, as shown in FIG. 5, are arranged at different elevations, the heater 160a being at the highest elevation, the heater 160b somewhat lower and the heater 160c being at the lowest elevation. Heater assembly 161 similarly comprises three heaters 161a, 161b and 161c which are arranged at different elevations as shown. The heaters are preferably of the blower type in which a current of air created by release of compressed air is heated by an electric heating element. The speed of the air may be controlled by a valve and the degree of heat may be controlled by a rheostat.

Referring to FIG. 6, containers are shown at four different positions in their travel past heater assembly 160. The container at the left is shown approaching the heater assembly; the next container is shown opposite heater 160a; and the last container is shown opposite heater 160c. The heater 160a directs heat against the film 16 at a level just above the overlap 21, that is to say at approximately the junction of the overlap and the main body portion of the film. The heater 160b directs heat against the upper portion of the overlap 21 and the heater 160c directs heat against the lower portion of the overlap 21. The arrows indicate the direction of flow of hot air from the heaters 160a, 160b and 160c. Meanwhile the container will be spinning and will have spun at least one revolution while passing each of the heaters 160a, 160b and 160c. The effect of this procedure is as shown in FIGS. 6A, 6B and 6C. That is, the heat shrinking of each lower overlap 21 starts at the top and proceeds downwardly with the result that air is squeezed out and a tight, bubble free bond is effected between the film and the rounded lower portion 15 of the container.

A similar procedure occurs at the upper overlap 20 as the container passes the heaters 161a, 161b and 161c. That is to say, the overlap 20 will be shrunk by heater 160a at approximately the junction of the overlap 21 and the main body portion of the film, then shrinking will occur upwardly of this level and finally the edge of the overlap 21 will be shrunk onto the rounded portion 14 of the container thereby accomplishing the same effect as described above with reference to the heaters 160a, 160b and 160c.

The heater assemblies 160 and 161 are shown in sequence with the assembly 160 preceding the assembly 161. This order may be reversed and the assembly 160 and 161 may be in vertical alignment. However, a spacing between them is preferred as shown because it has a lesser tendency to overheat the film and the containers, and in particular the glue line applied at the seam of the film. That is, by the time a container and film reach heater assembly 161 much of the heat applied by the preceding heater assembly 160 will have been dissipated.

The seam at the overlap or freestanding edge (or edges) of the film may have glue applied to it but such is unnecessary.

Figure 7:
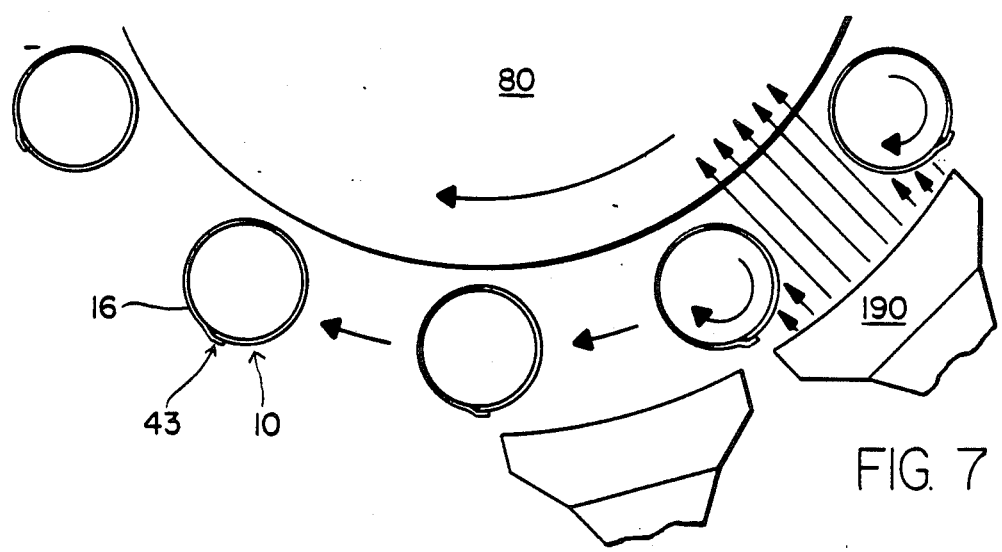
FIG. 7 is a fragmentary diagrammatic view of the turret and of containers transported by the turret past the heat shrinking station.
Figure 8:
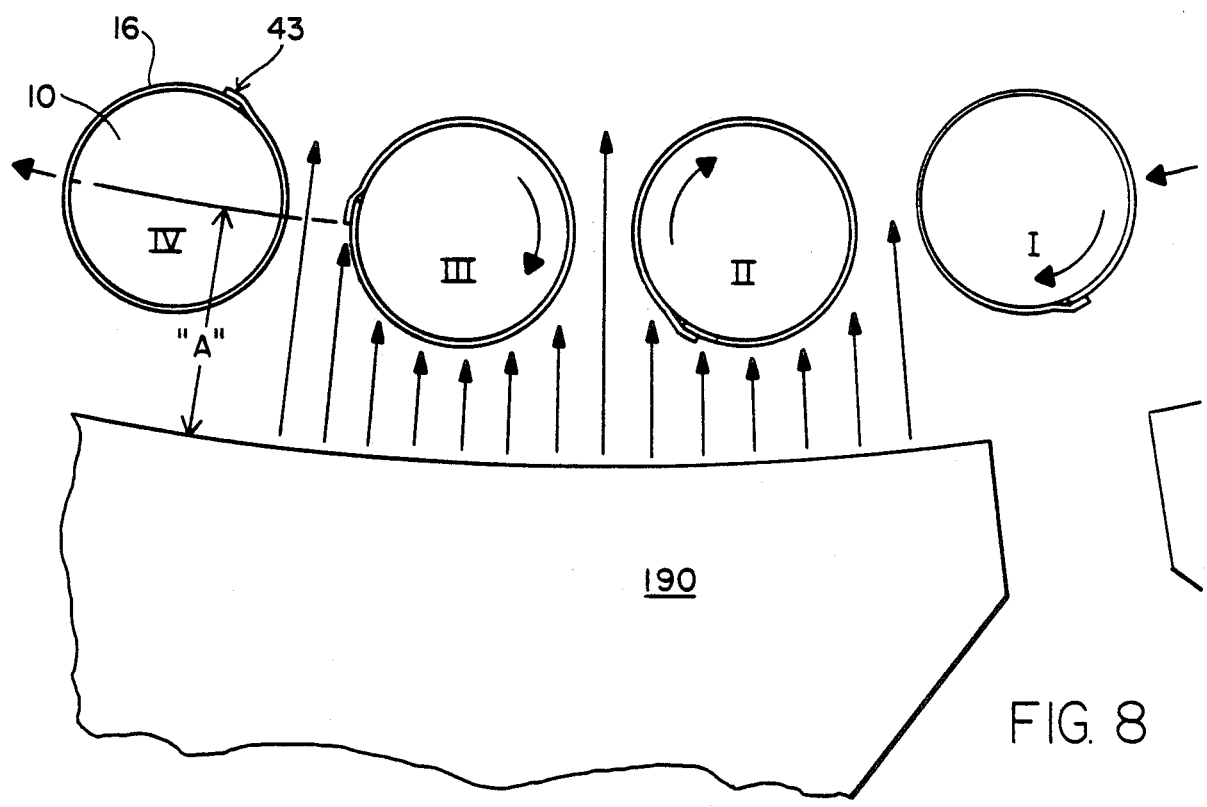
FIG. 8 is a similar view on an enlarged scale illustrating the nature of the problem mentioned above.

Referring now to FIGS. 7 and 8, the turret 80 is shown in FIG. 7 and two blowers 190 (which may be groups of blowers as in FIGS. 4 and 5) are also shown. Motion of the turret 80 is clockwise and spinning of the containers is also clockwise. Containers 10 with labels 16 applied thereto and having side seams 43 pass by the blowers which, as indicated by the arrows, blow hot air radially inwardly. In FIG. 8 containers 10 are shown in four different positions I, II, III and IV as they pass by a blower 190.

I have found that the critical positions insofar as the difficulty above mentioned with the side seam is concerned is the positions at II and III where the side seam is parallel or nearly parallel to the flow of hot air. That is to say at positions II and III the hot air is tangent or nearly tangent to the side seam and it is blowing directly or nearly directly at the glue line 47 (see FIG. 2). This softens or melts the glue sufficiently to cause curling and an improper shrinkage of the side seam.

Figure 9:
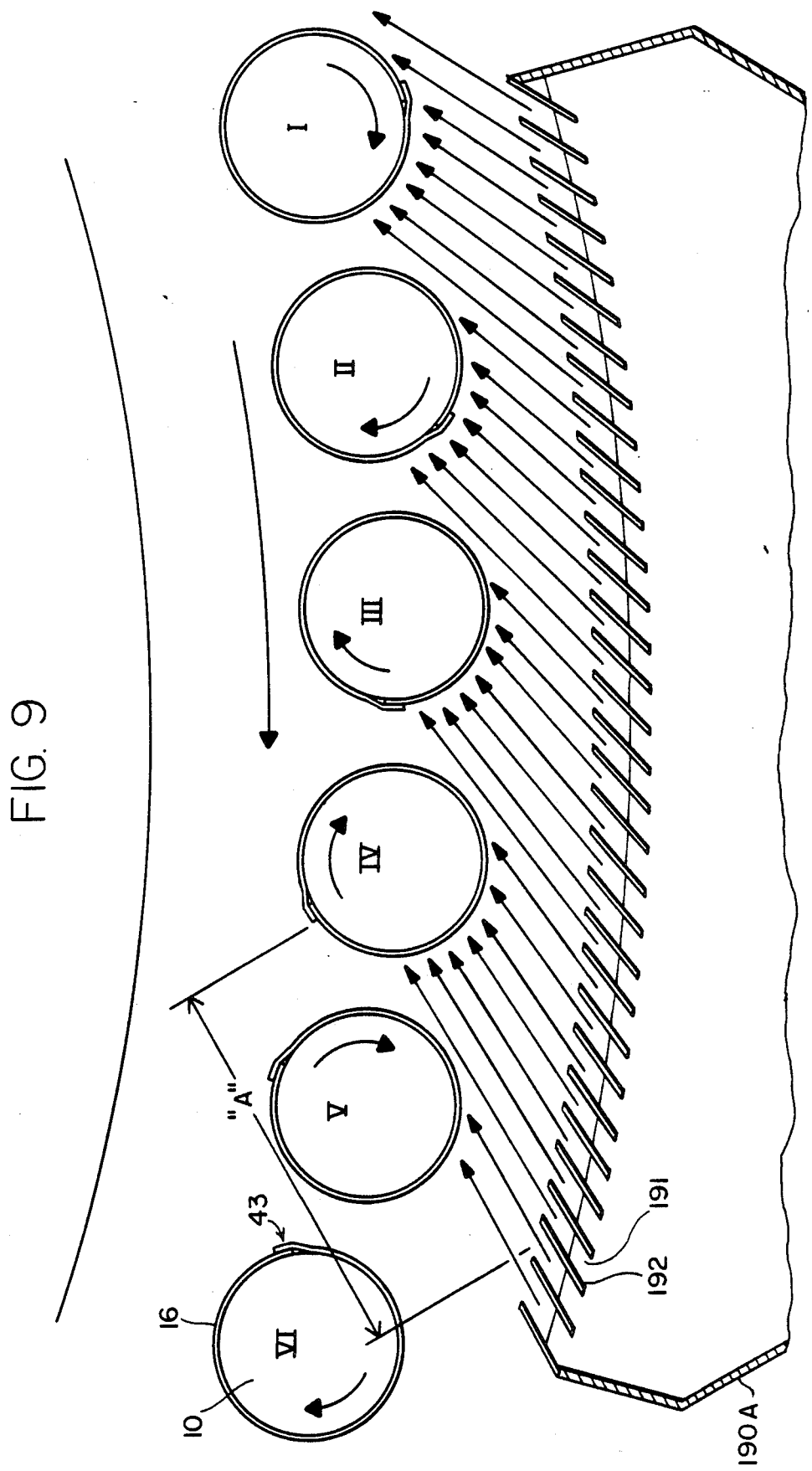
FIG. 9 is a view similar to that of FIG. 8 but showing the manner in which this problem is solved in accordance with the present invention.

Referring now to FIG. 9, a modified blower 190A is shown in section having a front cover 191 formed with slanted openings 192. The cover 191 may, if desired, be formed by louvres which are adjustable so as to enable one to adjust the angle of the openings 192 and therefore the direction of flow of air from the blower.

The arrows indicate the direction of the current of hot air. At position II (which is not as critical as position III) the hot air travels a longer distance before impinging on the side seam than in FIG. 8. Also it is oblique to the side seam. In position III (the most critical position) not only does the hot air travel farther but the side seam of the container at position III is shielded by the preceding container at IV. The container at position IV has its side seam parallel to the flow of hot air but in addition to shielding by the preceding container at position V the hot air has to travel the longer distance "A".

The clockwise spinning motion of the containers as viewed in FIG. 1 has the advantage that when the side seam is exposed to the hot air it is moving away from the source of hot air.

A suitable angle for the openings 191 in blower 190A is 60° but other angles may be employed provided the angle accomplishes the desired results.

Referring again to FIG. 1, another feature of the invention which aids in the controlled application of heat to the projecting ends 20 and 21 and to the side seams 43 is shown in the form of a shield 200 which is concentric to the turret 80 and which is located inside the turret opposite the containers 10 as they pass by the hot air blowers. This shield is held stationary by a bracket or brackets (not shown) which are inserted into the turret between the upper and lower spokes 83 and 85 and which enter the turret between the container input and output points A and G (see FIG. 1). This shield serves to retain hot air in the shrink area thus making the entire system more energy efficient.

It will be apparent that a novel and advantageous method and apparatus have been provided for applying heat shrinkable labels and the like to containers and the like and for heat shrinking the projecting end portions of the applied labels, including the side seams thereof.

I claim:

1. A method of applying heat shrinkable film to articles each of said articles having a vertical body and an inwardly sloping end portion at at least one end of the body, such method comprising:
   (a) cutting segments of such film from a continuously moving length of film, each segment having a leading end and a trailing end
   (b) continuously transporting each severed segment to an applicator station
   (c) continuously transporting such articles to said applicator station
   (d) continuously applying the leading end of each segment at such applicator station to the body of an article, wrapping it tightly around the article with the trailing end of the segment overlapping the leading end and forming a side seam which is held together by means of an adhesive and in so doing allowing one edge or both edges of the applied segment to project beyond the body portion and overlie, but to be spaced from, the adjacent inwardly sloping portion or portions of the article
   (e) said side seam being a laminar structure comprising an outer strip formed by the trailing end of the segment, an inner strip formed by the leading end of the segment and an intermediate strip formed by said adhesive, said intermediate strip presenting an exposed area at the outer extremity of said trailing end, said exposed area being susceptible to melting when a current of hot air impinges directly upon it thereby resulting in damage to the side seam
   (f) continuing the transport of such articles so wrapped with segments of heat shrinkable film (and meanwhile spinning the articles) through a heating station
   (g) blowing hot air onto the projecting edge or edges of the articles during transport through the heating station to shrink such edge or edges onto the article and
   (h) minimizing damage to said side seams by (1) spinning said articles in a direction in relation to the transport of said articles in step (f), so that the outer strip of each side seam intervenes between the hot air and the intermediate strip except while the side seam is receding from the source of hot air, and (2) packing the articles sufficiently closely together and maintaining the direction of rotation and the direction of transport of said articles such that when the intermediate strip of each article is not shielded by said outer strip, it is shielded by a preceding article.

2. The method of claim 1 wherein in step (d) the segment of heat shrinkable film is secured to the container solely by the adhesive at the side seam.

3. Apparatus for heat shrinking heat shrinkable film onto articles each of which has a vertical body and at least one end portion sloping inwardly from the body, each such article being tightly wrapped with a heat shrinkable but unshrunken film said film having a leading end and a trailing end, said leading end overlapping said trailing end to form a side seam which is held together by means of adhesive, said film projecting beyond the body portion at at least one edge and lying opposite but unattached to such sloping portion or portions, said side seam being a laminar structure comprising an outer strip formed by the trailing end of the segment, an inner strip formed by the leading end of the segment and an intermediate strip formed by said adhesive, said intermediate strip presenting an exposed area at the outer extremity of said trailing end, said exposed area being susceptible to melting when a current of hot air impinges directly upon it thereby resulting in damage to the side seam, said apparatus comprising (a) means for continuously transporting such articles so wrapped with segments through a heating station
(b) means for spinning the articles while so transported
(c) means for applying a current of hot air at such heating station to the projecting edge portion or portions of the film to heat shrink the same without heat shrinking the major part of the body portion of the film
(d) said means (a) and (b) being such that the outer strip of each side seam intervenes between the hot air and the intermediate strip except when the side seam is receding from the source of hot air and
(e) means for supporting the articles in closely packed array during transport such that during transport and spinning of the articles, the exposed area of each side seam is shielded by a preceding article when not shielded by the outer cover strip.

* * * * *